(12) United States Patent
Bontrager et al.

(10) Patent No.: US 6,483,048 B1
(45) Date of Patent: Nov. 19, 2002

(54) AUTOMOTIVE TRIM PANEL WITH ELECTRICAL WIRING INCORPORATED THEREIN

(75) Inventors: Dwayne Bontrager, Canton; David Mark Misaras, Rochester Hill; Jill Marie-Nichols Mazzola, Macomb Township, all of MI (US)

(73) Assignee: Textron Automotive Company, Inc., Troy, MI (US)

( * ) Notice: Subject to any disclaimer, the term of this patent is extended or adjusted under 35 U.S.C. 154(b) by 50 days.

(21) Appl. No.: 09/625,113

(22) Filed: Jul. 25, 2000

(51) Int. Cl.⁷ .................................................. H01H 9/02
(52) U.S. Cl. .................. 200/5 R; 200/52 R; 200/302.1; 200/512; 296/153; 297/411.21
(58) Field of Search ................................ 200/5 R, 5 A, 200/52 R, 61.54, 61.55, 61.57, 302.1, 302.2, 512, 514; 296/153; 297/411.2, 411.21; 307/10.1

(56) References Cited

U.S. PATENT DOCUMENTS

| | | | |
|---|---|---|---|
| 4,575,117 A | * 3/1986 | Uchida | 200/61.54 |
| 4,742,192 A | * 5/1988 | Levine et al. | 200/61.57 |
| 4,831,278 A | 5/1989 | Ueda et al. | 307/10.1 |
| 4,904,429 A | 2/1990 | Takahashi et al. | 264/46.7 |
| 5,297,334 A | 3/1994 | Johnson | 29/861 |
| 5,324,203 A | 6/1994 | Sano et al. | 439/34 |
| 5,442,518 A | 8/1995 | Beam | 361/690 |
| 5,448,028 A | 9/1995 | Filion et al. | 200/52 R |
| 5,463,258 A | * 10/1995 | Filion et al. | 200/61.54 |
| 5,712,764 A | 1/1998 | Baker et al. | 361/690 |
| 5,952,630 A | 9/1999 | Filion et al. | 200/5 R |
| 6,042,142 A | * 3/2000 | Ricks | 200/61.54 |
| 6,126,228 A | * 10/2000 | Davis et al. | 296/146.7 |

FOREIGN PATENT DOCUMENTS

| | | | |
|---|---|---|---|
| JP | 63-13842 | 1/1988 | B60R/16/02 |
| JP | 63-49556 | 3/1988 | B60K/37/00 |
| JP | 63-65412 | 3/1988 | B29C/39/10 |
| JP | 63-166508 | 7/1988 | B29C/43/18 |
| JP | 64-19620 | 1/1989 | H01B/13/00 |
| JP | 64-19621 | 1/1989 | H01B/13/00 |
| JP | 1-258941 | 10/1989 | B29C/67/18 |
| JP | 2-128830 | 5/1990 | B29C/67/18 |
| JP | 2-128944 | 5/1990 | B60R/16/02 |
| JP | 2-299294 | 12/1990 | H05K/7/02 |
| KR | 48-108336-01 | 3/1972 | |

* cited by examiner

Primary Examiner—Michael Friedhofer
(74) Attorney, Agent, or Firm—Grossman, Tucker, Perreault & Pfleger, PLLC

(57) ABSTRACT

A vehicle interior trim panel and method of making is provided where the vehicle interior trim panel comprises a skin, a substrate, a foam located between the skin and the substrate, and a flat wire at least partially surrounded by and embedded in the foam.

10 Claims, 2 Drawing Sheets

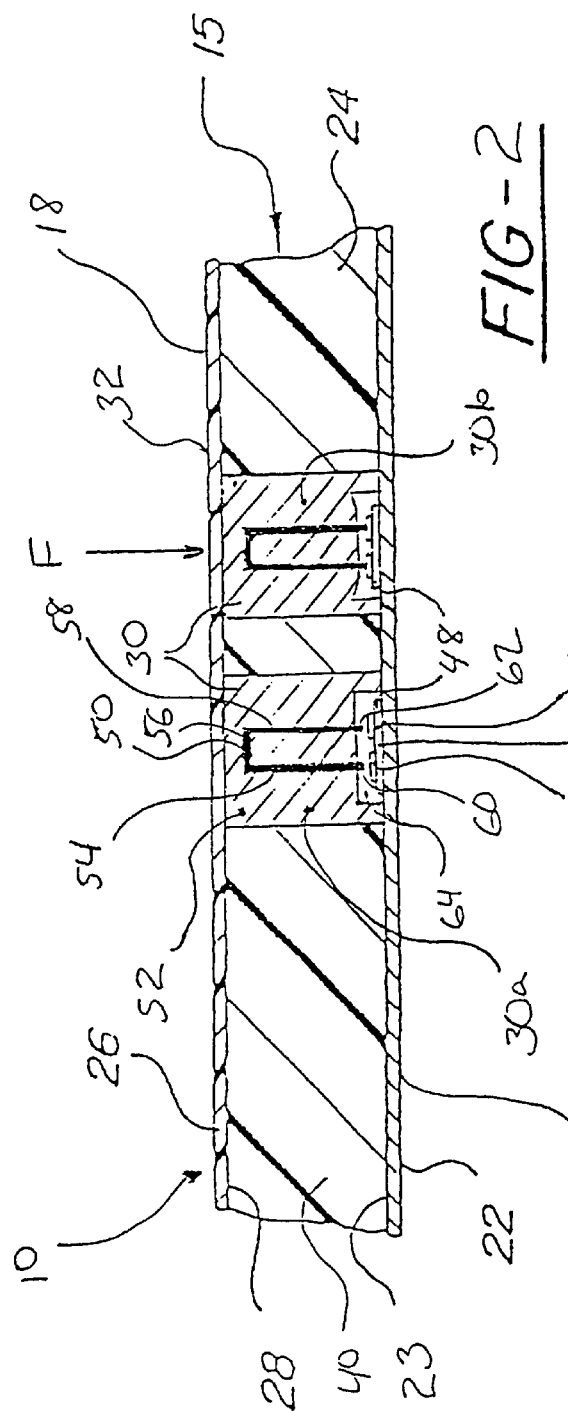
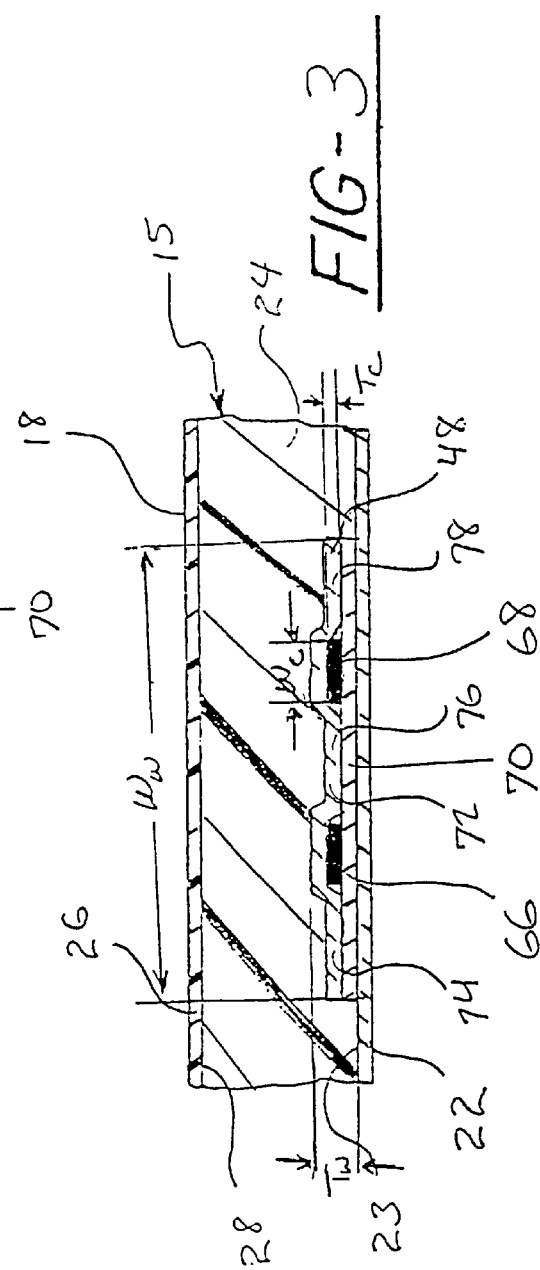

AUTOMOTIVE TRIM PANEL WITH ELECTRICAL WIRING INCORPORATED THEREIN

TECHNICAL FIELD OF THE INVENTION

This invention relates generally to trim panels with electrical wiring incorporated therein and, more particularly, to trim panels which make use of flat wiring.

BACKGROUND OF THE INVENTION

U.S. Pat. No. 4,904,429 recites a method of producing an instrument panel of a motor vehicle or similar molding of foamed resin capable of fitting electrical parts thereon as desired. More particularly, the '429 Patent recites a method of producing a molding of foamed resin in which a flexible printed circuit (FPC), which is electrically connectable to electrical parts, is buried.

The '429 Patent also recites that an instrument panel has customarily been implemented as a laminate having three layers, i.e., a covering made of soft resin, a base made of ABS resin or similar hard resin, and a padding made of foamed urethane or similar foaming resin and sandwiched between the covering and the base, and that an FPC and couplers are each mounted on the base by using adhesive or screws. Continuing, the '429 Patent recites that such a prior art three-layer instrument panel, however, is not satisfactory because the base and the padding have to be produced independently of each other and then bonded together, resulting in a disproportionate production cost.

As an alternative to the prior art three-layer instrument panel described by the '429 Patent, the '429 Patent recites that the base may be formed from a foamed resin and molded integrally with the padding. However, when the base is formed from a foamed resin, the '429 Patent then discloses that the FPC and couplers may not be mounted with screws or adhesives. Consequently, the '429 Patent proposes. a solution for mounting the FPC and couplers to this alternative structure by burying the FPC and couplers in the base when the latter is molded.

In light of the '429 Patent, what is needed is a structure and method of combining a flat wire with a three-layer interior trim panel without the need for separate fasteners, such as screws, or adhesives.

SUMMARY OF THE INVENTION

Accordingly, the present invention provides a structure and a method for combining a flat wire with a three-layer instrument panel without the need for separate fasteners, such as screws, or adhesives.

According to one feature of the invention, a vehicle interior trim panel is provided comprising a skin, a substrate, a foam located between the skin and the substrate, and a flat wire at least partially surrounded by and embedded in the foam. The wire herein is therefore either physically placed within the foam, or, in the alternative, chemically bonded to the foam material.

According to another feature of the invention the flat wire comprises a flexible printed circuit.

According to another feature of the invention, the foam comprises a density between 0.016 g/cm$^3$ to 0.288 g/cm$^3$.

According to another feature of the invention, the foam comprises an ultimate elongation greater than five percent.

According to another feature of the invention, a vehicle interior trim panel is provided comprising a skin, a substrate, a foam located between the skin and the substrate, and a switch at least partially surrounded by and embedded in the foam.

According to another feature of the invention, a method of forming a vehicle interior trim panel comprises providing a substrate, a skin, a flat wire between the substrate and skin, and forming a foam layer between the substrate and the skin surface such where the foam bonds the substrate to the skin and at least partially surrounds and embeds the flat wire in the foam layer.

According to another feature of the invention, the step of forming the foam layer further comprises molding the foam layer below twenty-five pounds-per-square-inch molding pressure.

BRIEF DESCRIPTION OF THE DRAWINGS

To better understand and appreciate the invention, refer to the following detailed description in connection with the accompanying drawings:

FIG. 2 is a cross sectional view of the switch of the interior trim panel electrical switch assembly of FIG. 1 taken along section line 2—2;

FIG. 3 is a cross sectional view of the wire of the interior trim panel electrical switch assembly of FIG. 1 taken along section line 3—3;

DETAILED DESCRIPTION OF THE INVENTION

Figure 1:
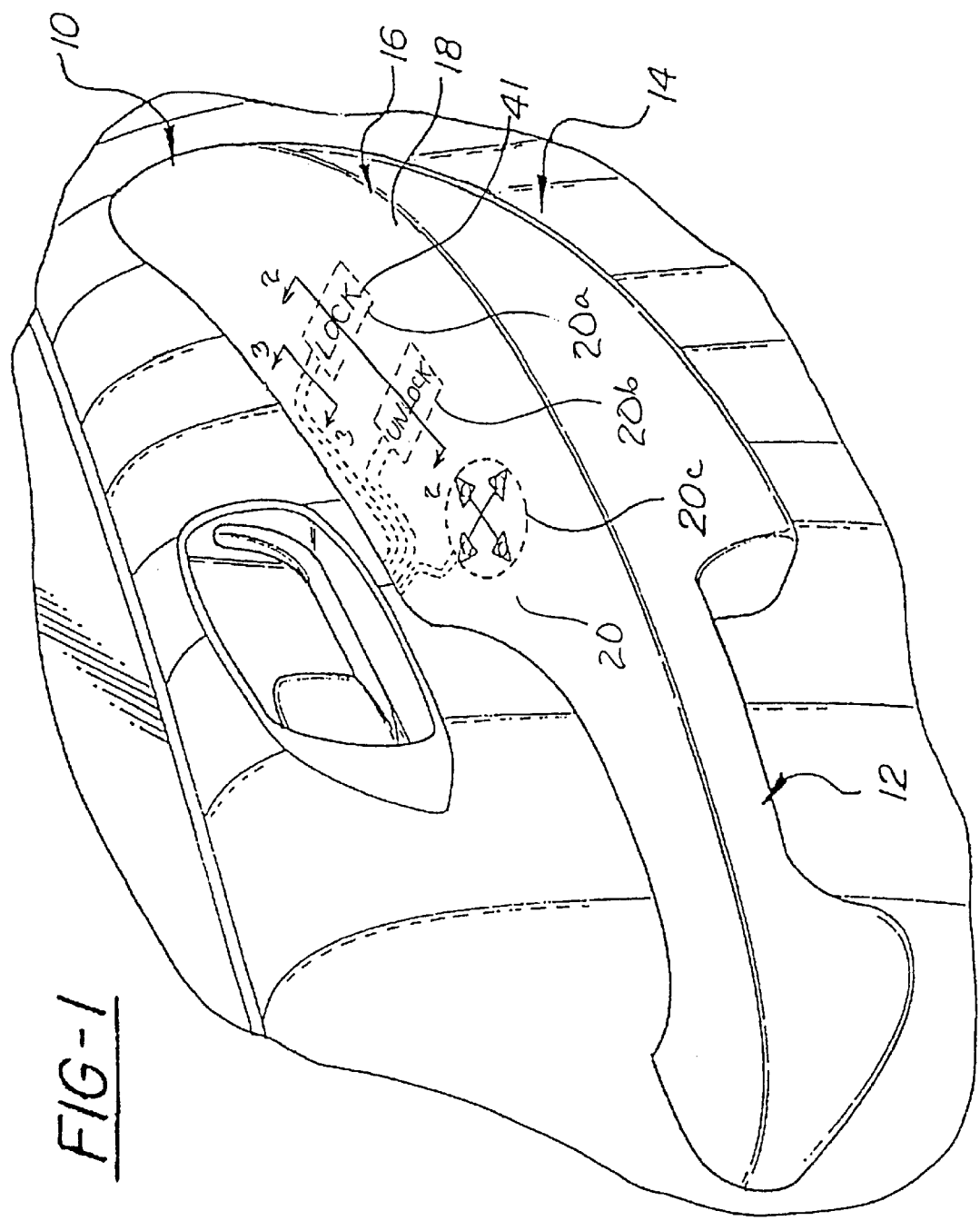
FIG. 1 is a perspective view of an interior trim panel electrical switch assembly according to the present invention.

An exemplary vehicle interior trim panel electrical switch assembly of the type for actuating various vehicle electrical devices is shown at 10 in FIG. 1 in connection with an armrest 12 for a vehicle trim panel 14, such as a door panel. As shown in FIGS. 1 and 2, the armrest 12 is formed as a soft feel composite 15 which includes a switch panel portion 16 that has an outer surface 18 covering a switch array 20 including three electrical switches indicated at 20a–20c. Two of the three electrical switches may be for locking and unlocking the doors of the vehicle while the remaining switch may be a multiposition switch for adjusting the position of the side view mirror. Other switches not shown may include, but are not limited to, switches for opening and closing windows, seat adjustment and for selecting either the left or the right side view mirror for adjustment.

The armrest 12 is shown as a separate member from the trim panel 14, but the armrest and trim panel 14 could be formed as one integral interior trim panel. Furthermore, the vehicle interior trim panel electrical switch assembly 10 can be employed on any interior surface of any trim panel in the vehicle. For example, it can be part of the instrument panel, headliner, overhead console, seats or any other part of a vehicle interior.

Additionally, the switch array 20 can vary in number and location. For example, in another application a single switch can be provided to operate an overhead light, a power operated sunroof or other electrically switched accessory on a motor vehicle. Other arrangements will depend upon the system being controlled by the switch array 20 underlying the switch panel portion 16.

As shown in FIG. 2, the soft feel composite 15 and switch panel portion 16 of the interior trim panel electrical switch assembly 10 comprises a substrate layer 22, a foam layer 24, and a skin layer 26. The outer surface 18 of skin layer 26 is the surface generally viewed by a vehicle occupant and is preferably continuous between the soft feel composite 15 and switch panel portion 16 of trim panel 14. Generally, foam layer 24 is bonded directly to outer surface 23 of substrate layer 22 and to inner surface 28 of skin layer 26.

A switch 30 and a wire 48 are located beneath outer surface 18 within the switch panel portion 16 of the interior trim panel electrical switch assembly 10. Preferably, the switch 30 has a low profile which allows it to be easily incorporated under outer surface 18 of skin layer 26 of the switch panel portion 16. As used in this specification, a low profile switch has a thickness less than or equal to that of foam layer 24. In other words, a thickness less than or equal to the distance as measured between the inner surface 28 of skin layer 26 and outer surface 23 of substrate layer 22. More preferably, the switch 30 provides a substantially flat or arcuate surface region 32 in outer surface 18 of skin layer 26 without any bumps, ridges or other disruptions in outer surface 18. However, it is recognized that certain disruptions in the outer surface 18 may be desirable as to provide assistance in locating switch panel portion 16 in an environment of reduced light or when it is unsafe for the driver to remove his vision from the road for the purposes of locating switch panel 16.

Switch 30 preferably comprises a switch arm 50 disposed within a housing portion 52. Switch arm 50 functions as a conductor and preferably comprises a metal such as copper. In the illustrated exemplary embodiment, switch arm 50 is preferably U-shaped and comprises elongated member 54 connected to elongated member 58 by connecting member 56. Preferably connecting member 56 is completely embedded in housing 52 which functions as an insulator while elongated member 54 and elongated member 58 are only partially embedded within housing portion 52 with contact portions 60 and 62 respectively thereof remaining exposed. Preferably, housing portion 52 comprises a polymer material and more preferably the polymer material comprises a silicone polymer.

Preferably, housing 52 also comprises a recessed cavity 64 into which contact portions 60 and 62 of elongated members 54 and 58 project into. Recessed cavity 64 also preferably contains a wire 48. Wire 48 comprises conductors 66 and 68 as well as an insulator 70 upon which conductors 66 and 68 are located. Outside the confines of recessed cavity 64, wire 48 also includes an insulator 72 as shown in FIG. 3.

Apart from operation, switch 30 exists more particularly as switch 30a in which the associated electrical circuit is in a normally open state. Then, during operation, switch 30 exists more particularly as switch 30b in which the associated electrical circuit is in a closed state. More specifically, during operation a force F is applied to outer surface 18 of skin layer 26. Force F is ordinary applied by the vehicle occupant through the fingertips. Upon application, force F works on skin layer 26 and housing 52 such that they deform to enable contact portions 60 and 62 of elongated members 54 and 58 of switch arm 50 to contact conductors 66 and 68 of wire 48 and thus close the electrical circuit as created through connecting member 56 of switch arm 50.

As indicated above, within the confines of recessed cavity 64, wire 48 comprises conductors 66 and 68 as well as an insulator 70 upon which conductors 66 and 68 are located. However, as also indicated above, outside the confines of recessed cavity 64, wire 48 also includes an insulator 72 as shown in FIG. 3. It is noted that insulator 72 exists outside the confines to recessed cavity 64 generally to protect conductors 66 and 68 from undesirable short circuits outside the confines of recessed cavity 64. More specifically, conductors 66 and 68 of wire 48 are protected from short circuit by virtue of being encapsulated between insulators 70 and 72.

As can best be seen from FIG. 3, conductors 66 and 68 preferably have a thin cross sectional thickness with a width Wc greater than thickness Tc. More particularly, conductors 66 and 68 comprise an electrically conductive metal, such as copper or similar metal, in the form of a thin foil. Insulators 70 and 72 comprise thin films, preferably polymer films and more preferably urethane polymer films which are laminated about their edges 74 and 78 as well as a central portion 76 located between conductors 66 and 68. The use of one or more conductors with a rectangular shape sandwiched between two polymer films may be referred to as "flat" wire. The use of flat wire, as opposed to traditional round wire with a round conductor, is preferred for at least partially surrounding and embedding wire 48 in the foam layer 24 by virtue if its thinner cross-sectional thickness than traditional round wire.

More particularly, the flat wire 48 may take the form of a flexible printed circuit (FPC). A FPC generally consists of a pair of polymer or resin films with one or more copper, or similar metal, foils sandwiched therebetween. Upon operation, the metal foil generally functions as an electrical circuit routing electric current between one or more connected electrical devices.

In addition to switch 30 and wire 48 being located beneath the outer surface 18 of the switch panel portion 16 of the interior trim panel electrical switch assembly 10, preferably they are at least partially surrounded by and embedded in the foam layer 24 of the soft feel composite 15.

Preferably, prior to being at least partially surrounded and embedded by the foam layer 24, switch 30 is joined to the inner surface 28 of skin layer 26 or to the outer surface 23 of substrate layer 22, but it is recognized that switch 30 may be positioned at any location therebetween. More preferably, switch 30 is joined to the inner surface 28 of skin layer 26 and/or to the outer surface 23 of substrate layer 22, by a double-sided pressure sensitive adhesive tape located therebetween.

As with switch 30, prior to being at least partially surrounded and embedded by the foam layer 24, wire 48 may also be joined to the inner surface 28 of skin layer 26 or to the outer surface 23 of substrate layer 22, but it is recognized that wire 48 may be positioned at any location therebetween. More preferably, wire 48 is joined to the outer surface 23 of substrate layer 22 by a double-sided pressure sensitive adhesive tape located therebetween or mechanical type engagement clips.

In order to at least partially surround and embed the switch 30 and/or wire 48 in foam layer 24, the switch 30 and/or wire 48 are preferably placed in the cavity 40 created between the inner surface 28 of skin layer 26 and the outer surface 23 of substrate layer 22 as shown in FIG. 2 prior to the introduction of the foam layer 24. Then, foam layer 24 is preferably formed by introducing a foam, or more preferably, a foam precursor material into cavity 40. Preferably, the foam precursor is a urethane foam precursor which is introduced using a reaction injection molding process as known in the art. After the urethane foam precursor is introduced, the reactive constituents, a polyol and isocyanate, begin to react and the subsequently created foam material flows within the cavity 40 thus bonding skin layer 26 to substrate layer 22 while at the same time and flowing around and preferably bonding to the exposed surfaces of switch 30 and wire 48.

Alternatively, switch 30 and/or wire 48 may be located in the skin layer 26. For example, the switch 30 may be held in place as skin-casting material is cast around it as more particularly shown in U.S. Pat. No. 5,269,559 assigned to the assignee of the present invention and incorporated herein by reference.

In the embodiment shown in FIGS. 1, 2 and 3, many types of adhesives, including urethanes, etc., may be used to bond the switch 30 or wire 48 to skin layer 26 or substrate 26 of trim panel 14. The adhesives may be applied in any one of a number of forms to include pressure-sensitive backings, hot melts and spray coatings.

While skin layer 26 is preferably formed by casting, skin layer 26 may also be formed by spray coating, blow molding, or thermoformed sheet and then incorporated into the subsequent foam forming process identified above. With regards to more specific skin materials, skin layer 26 may comprise thermoset or thermoplastic polymers. This group includes, but is not limited to, polymers containing vinyl (e.g. polyvinyl chloride (PVC)), urethane (e.g. thermoplastic urethane (TPU)), olefin (e.g. poylpropylene (PP), polyethylene (PE), thermoplastic olefins (TPO)), and styrene (e.g. acrylonitrile-butadiene-styrene (ABS)). Also while foam layer 24 is preferably joined to skin layer 26 and substrate layer 22 simultaneously by the reaction injection molding process, foam layer 24 may also be joined to skin layer 26 prior to introduction of substrate layer 22 rather than simultaneously as identified above. For example, skin layer 26 and foam layer 24 may be provided as a multi-layer sheet which is subsequently heated and vacuum formed over substrate layer 22.

In the various embodiments, the foam layer preferably has certain molding conditions and physical properties. With regards to molding conditions, the foam layer 24 is preferably molded below 25 PSI (pounds per square inch) molding pressure and more preferably below 15 PSI molding pressure and even more preferably below 10 PSI molding pressure as to reduce any deformation of the FPC during the foam molding process. With regards to measuring the molding pressure, it is noted that molding pressure may be measured at any location within the trim panel 14. With regards to physical properties, the foam layer 24 preferably exhibits the following:

| Property | Test Method | Value |
| --- | --- | --- |
| Density | ASTM-3574-95 | 0.016–0.288 g/cm$^3$ |
| Ultimate Elongation | ASTM-3574-95 | Greater than 10% |

With regards to measuring density, while any suitable test method may be used, the preferred test method is that of ASTM-3574-95, Test A—Density Test. With regards to range of density values, while the preferred value identified above is from 0.016 to 0.288 g/cm$^3$, more preferably the value is from 0.06 to 0.15 g/cm$^3$. With regards to the measured value, it is noted that the above values correspond to that of any single specimen (taken from any location within the trim panel 14), either an interior density specimen or a section density specimen as defined in ASTM-3574-95, and not the calculated median of more than one measured specimen. This is in accordance with ASTM-3574-95, paragraph 11.1 which calls for a single specimen to be tested.

With regards to measuring ultimate elongation, while any suitable test method may be used, the preferred test method is that of ASTM-3574-95, Test E—Tension Test. With regards to the range of elongation values, the preferred value identified above is greater than or equal to five percent (5%), more preferably the value is greater than or equal to ten percent (10%), and even more preferably the value is greater than or equal to twenty-five percent (25%) ultimate elongation. With regards to the measured value, it is noted that the above values correspond to that of any single specimen (taken from any location within the trim panel 14), as defined in ASTM-3574-95, and not the calculated median of more than one measured specimen. This is in deviation with ASTM D-3574-95, paragraph 48.1 which calls for three specimens to be tested and the median value to be reported.

Indicia 41 in the form of letters, numbers, or symbols may be printed, such as with silk screening, or molded on outer surface 18 of the skin layer 26 to indicate to vehicle occupants the position and/or function of each switch 30 or switch array 20 as shown in FIGS. 1 and 2.

A transparent protective coating may be applied to the outer surface 18 of the skin layer 26 and to the indicia 41. The coating is preferably applied as a liquid and is then dried to form a thin durable protective film that keeps the indicia from rubbing off as is described in greater detail in U.S. Pat. No. 5,448,028 assigned to the assignee of the present invention and incorporated herein by reference.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

What is claimed:

1. A vehicle interior trim panel comprising:
    a skin comprising an outer skin surface and an inner skin surface;
    a substrate comprising an outer substrate surface and an inner substrate surface;
    a foam located between said inner skin surface and said outer substrate surface, said foam having a thickness;
    a switch panel portion within said trim panel comprising a switch that includes an insulating housing including a conductive switch arm containing two contact portions, said housing including a cavity in which said contact portions project, said cavity including two flat conductors to contact said contact portions of said switch arm, wherein said switch has a thickness less than or equal to said thickness of said foam layer wherein said switch and said flat conductors are located beneath the outer skin surface and partially surrounded by and embedded in said foam layer.

2. The foam of claim 1 wherein the foam comprises a density between 0.016 g/cm$^3$ to 0.288 g/cm$^3$.

3. The foam of claim 1 wherein the foam comprises an ultimate elongation greater than five percent.

4. The foam of claim 1 wherein the foam comprises an ultimate elongation greater than ten percent.

5. The foam of claim 1 wherein the foam comprises an ultimate elongation greater than twenty-five percent.

6. The vehicle interior trim panel of claim 1 wherein said insulating housing comprises a silicone polymer.

7. A method of forming a vehicle interior trim panel comprising:
    providing a substrate comprising an outer substrate surface and an inner substrate surface;
    providing a skin comprising an outer skin surface and an inner skin surface;

forming a foam layer between said inner skin surface and said outer substrate surface, said foam layer having a thickness;

providing a switch panel portion within said trim panel comprising a switch that includes an insulating housing including a conductive switch arm containing two contact portions, said housing including a cavity in which said contact portions project, said cavity including two flat conductors to contact said contact portions of said switch arm, wherein said switch has a thickness less than or equal to said thickness of said foam layer wherein said switch and said flat conductors are located beneath the outer skin surface and are partially surrounded by and embedded in said foam layer.

8. The method of claim 7 wherein the step of forming the foam layer further comprises molding the foam layer below twenty-five pounds-per-square-inch molding pressure.

9. The method of claim 7 wherein the step of forming the foam layer further comprises molding the foam layer below fifteen pounds-per-square-inch molding pressure.

10. The method of claim 7 wherein the step of forming the foam layer further comprises molding the foam layer below ten pounds-per-square-inch molding pressure.

* * * * *